Dec. 12, 1933.  A. URFER  1,939,374

LIQUID COMPASS

Filed April 5, 1929

INVENTOR
ADOLF URFER
BY
Cooper, Kerr & Dunham
ATTORNEYS

Patented Dec. 12, 1933

1,939,374

UNITED STATES PATENT OFFICE 1,939,374

LIQUID COMPASS

Adolf Urfer, Brooklyn, N. Y., assignor to Pioneer Instrument Company, Incorporated, Brooklyn, N. Y., a corporation of New York Application April 5, 1929. Serial No. 352,641

4 Claims. (Cl. 33—223)

This invention relates to liquid compasses and, more particularly, to means for preventing undesired oscillation and disturbance of the compass card because of loss of fluid from the compass. Because of the fact that it is almost impossible to build a liquid compass from which some liquid will not be lost during the expected life of the compass, provision must be made for assuring proper operation of such a compass even though some of its liquid has escaped. It is well known that some of the liquid may be lost because of the greater expansion of the liquid relative to the change in volumetric dimensions of the liquid confining chamber of the compass with the result that under relatively high temperature conditions some liquid is forced out at the joints. A yielding wall will tend to counteract the expansive force of the liquid but even in a compass equipped with such a wall some liquid may be lost and air admitted in its place. With air within the compass card chamber the liquid will splash and move freely and to such an extent as to cause great disturbance of the compass card and thereby very much abridge the advantages incident in the use of liquid compasses.

Among the objects of this invention is to provide a liquid compass having means for eliminating the disturbing effect upon a compass card because of air which has entered the compass card chamber.

Another object of the invention is to provide means whereby the expansion and contraction of the liquid of a liquid compass may be counteracted by an expansion chamber which communicates with the atmosphere and which is so positioned and proportioned in respect to the chamber of liquid surrounding the compass card as to leave but a relatively small sized passage for the liquid to move to and from the compass card chamber and the liquid chamber above the compass card chamber whereby, though there be an air space above the passage, the compass card will not be disturbed to an inordinate degree when the aircraft carrying the compass is accelerating or suddenly caused to change its direction of movement.

Another object of the invention is to provide a liquid compass having a novel compass-bowl.

Other objects and advantages will appear hereinafter in the description of the invention and the claims.

In the drawing, Fig. 1 is a section taken through the vertical axis of a liquid compass equipped with my invention.

Figure 1:
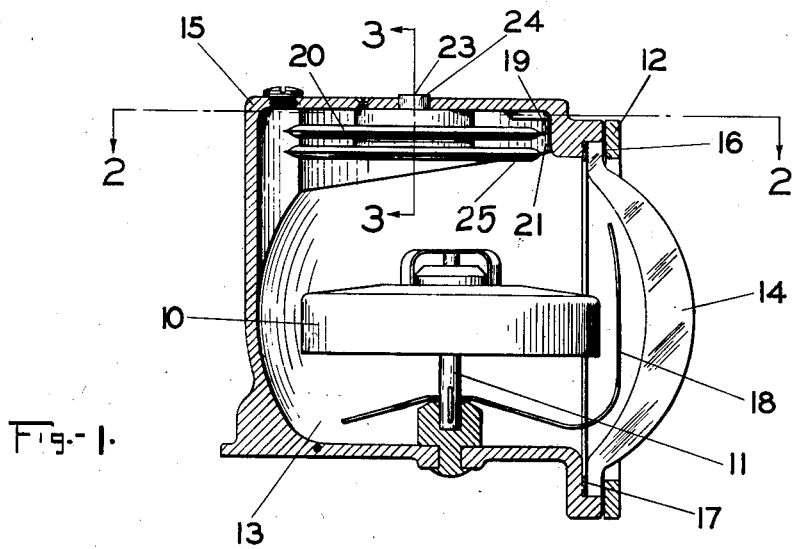
Figure 2:
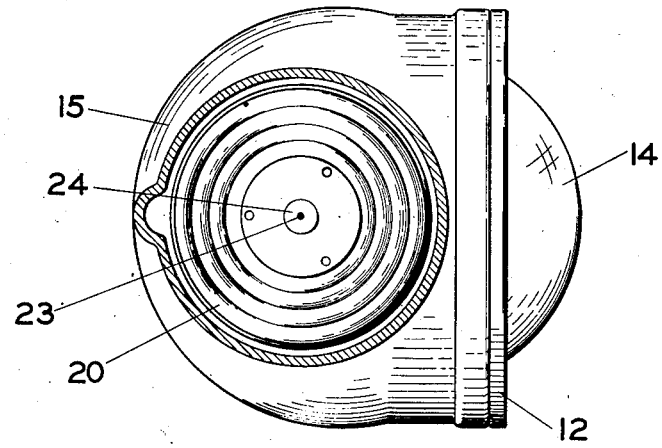
Fig. 2 is a horizontal section of the compass of Fig. 1 taken on line 2—2 of Fig. 1.
Figure 3:
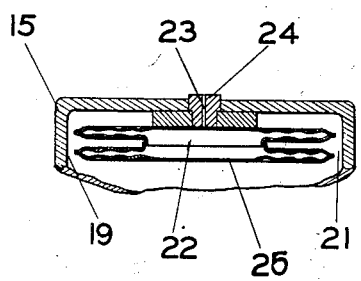
Fig. 3 is a section through the expansion chamber taken on line 3—3 of Fig. 1.

The liquid compass is well known and no extensive elucidation of its advantages need be set forth herein. However, my liquid compass is novel and is designed to minimize the possibility of gasket leakage by making the compass-bowl a one-piece rigid-body member requiring the use of but one gasket for mounting the lens. The liquid compass of my invention has the usual compass card 10 which is free to rotate and pivot upon a vertical post 11. Post 11 is mounted within the compass-bowl 15. So that there will be a minimum number of joints and seams the compass-bowl preferably is cast in one-piece as a die casting. The bottom and side wall of the die casting and lens 14 define the compass card chamber 13. A suitable gasket 17 is provided for assuring a tight fit between the compass-bowl 15 and lens 14. Lens 14 is held in place by a ring 12 between which and the lens 14 there is a gasket 16 of soft material. Usually a lubber's line 18 is disposed within the compass card chamber.

It is the general custom to fill the compass card chamber with a transparent liquid and in order that the compass card 10 may not be unduly disturbed by reason of the repeated displacement and splashing of liquid when air is present, care must be taken to make certain that no air is confined. It is appreciable that even though no air is initially trapped within the confines of the compass card chamber it frequently happens that air gets into the compass card chamber when some of the liquid is lost because of some such reason as the loosening of joints about gaskets, which result may be caused by changes in temperature and the different coefficients of expansion of the materials of the compass including the liquid. This result has occurred irrespective of attempts to obviate or minimize the same by the use of yielding or expansion walls.

In order to prevent the undesired and troublesome movement of the compass card because of the presence of confined air I make the following provisions. Compass-bowl 15 has a recess 19 cast in the upper portion thereof and in which may gather air bubbles which have entered the compass card chamber. This recess 19 is always in communication with chamber 13 and it has disposed therein an expansion member having a yielding wall 20. As shown, this yielding wall is made up of a plurality of interconnected annular and plate diaphragms, but whatever its form may be its position in recess 19 should be such as to allow only a relatively small passage 21 between the chamber of recess 19 and the compass card chamber 13 so as to act as a restriction upon the passage of liquid from one chamber to the other. By this arrangement the air bubbles which are likely to enter the compass card chamber will lodge against the upper surface of the chamber formed by recess 19 and yielding wall 20 and because of the limits of passage 21 all of the splashing and disturbance attributable to the presence of air will be restricted in a zone remote from the compass card 10 and its surrounding fluid in chamber 13.

The yielding wall 20 defines an expansion chamber 22 which preferably has communication with the atmosphere through a hole 23 in diaphragm center 24 so that the volume of the expansion chamber may readily vary when changes in volume of the fluid occur. While yielding wall 20 may take a variety of forms the multiple diaphragm form illustrated has been found satisfactory. It is clear that in this form of diaphragm wall the normal volume of the expansion chamber and the number of annular intercommunicating divisions of the liquid chamber formed within recess 19 may readily be varied by changing the number of inter-connected diaphragms. While this construction affords an irregular yielding wall for the expansion chamber 22 and for the chamber of recess 19 it contributes a well defined wall in the form of plate diaphragm 25 for the roof of the compass card chamber 13.

My invention is capable of a wide variation and relationship of parts without departure from the nature and principle thereof and I do not restrict myself unessentially in the foregoing or other particulars, but contemplate such alterations and modifications within the scope of the appended claims as may be found to be advisable.

What I claim is:—

1. The combination in a liquid compass, of a compass-bowl, said bowl forming a compass card chamber containing liquid, said bowl being shaped to form a recess in the upper portion thereof, and a yielding wall defining a liquid-tight expansion chamber whose interior is in communication with the outside air and disposed within said recess, said yielding wall having a portion thereof separating said recess from the compass card chamber to form a second chamber, said wall being slightly spaced from the compass bowl to form a limited passage between said chambers.

2. A liquid compass comprising, in combination, a compass-bowl having a compass card chamber containing a compass card and liquid, said compass-bowl comprising a one-piece casting having an opening in its wall and a recess at its upper portion, a glass closing said opening, and a yielding wall defining a liquid-tight chamber whose interior is in communication with the outside air and forming with said recess a second chamber in restricted communication with the chamber containing the compass card.

3. A liquid compass comprising, in combination, a compass-bowl having a liquid therein and formed with a substantially circular recess in the upper portion thereof in a horizontal plane, a compass card in said liquid and pivotally supported by said bowl below said recess, and an expansible diaphragm device disposed within said recess and forming two chambers, one of which is around the expansible diaphragm device and includes said recess, and the other of which is below said diaphragm device and contains the liquid, the interior of said diaphragm device being in communication with the atmosphere at the top of the bowl, and a portion of the diaphragm device being so disposed as to leave only a restricted passage between the upper and lower chambers, so that air bubbles which may be present in the liquid, will lodge against the upper surface of the upper chamber, and so that the splashing of the liquid will be restricted to said upper chamber, thereby eliminating the disturbing effects of the liquid upon the compass card.

4. The combination in a liquid compass, of a compass bowl, the interior of which is formed to provide a main chamber containing a liquid and an auxiliary chamber above the main chamber, an expansible diaphragm device disposed within the bowl above the main chamber and in the auxiliary chamber and having communication with the exterior of the bowl, said device being so positioned with respect to the interior wall of the auxiliary chamber as to form a restricted passage permitting liquid to flow from one of the chambers to the other.

ADOLF URFER.